(12) United States Patent
Lahnala (10) Patent No.: US 8,388,043 B2
(45) Date of Patent: Mar. 5, 2013

(54) SLIDING WINDOW ASSEMBLY

(75) Inventor: David W. Lahnala, Adrian, MI (US)

(73) Assignee: AGC Automotive Americas Co., Alpharetta, GA (US)

( * ) Notice: Subject to any disclaimer, the term of this patent is extended or adjusted under 35 U.S.C. 154(b) by 129 days.

(21) Appl. No.: 12/959,498

(22) Filed: Dec. 3, 2010

(65) Prior Publication Data

US 2012/0139289 A1    Jun. 7, 2012

(51) Int. Cl.
*B60J 1/18*    (2006.01)
*E05D 15/06*    (2006.01)

(52) U.S. Cl. ......... 296/146.16; 296/201; 49/63; 49/380; 49/413

(58) Field of Classification Search ............ 296/146.15, 296/146.16, 190.1, 201; 49/61, 63, 125, 49/380, 413
See application file for complete search history.

(56) References Cited

U.S. PATENT DOCUMENTS

| | | | |
|---|---|---|---|
| 5,154,028 A | 10/1992 | Hill et al. | |
| 5,228,740 A | 7/1993 | Saltzman | |
| 5,544,458 A | 8/1996 | Fisher et al. | |
| 5,799,449 A | 9/1998 | Lyons et al. | |
| 5,864,996 A | 2/1999 | Veldman et al. | |
| 5,915,780 A | 6/1999 | Kobrehel et al. | |
| 6,048,579 A | 4/2000 | Wang et al. | |
| 6,227,598 B1 | 5/2001 | Ichioka et al. | |
| 6,319,344 B1 | 11/2001 | Lewno | |
| 6,332,640 B1 | 12/2001 | Cornils et al. | |
| 6,487,823 B2 | 12/2002 | Lagrue | |
| 6,846,039 B2 | 1/2005 | Lewno | |
| 6,935,677 B2 | 8/2005 | Nania | |
| 7,003,916 B2 | 2/2006 | Nestell et al. | |
| 7,025,405 B2 | 4/2006 | Gillen | |
| 7,155,863 B2 | 1/2007 | Daniel et al. | |
| 7,219,470 B2 * | 5/2007 | Lahnala | ............... 49/413 |
| RE40,636 E | 2/2009 | Weinert et al. | |
| 8,088,319 B2 | 1/2012 | De Winter et al. | |
| 2003/0213179 A1 | 11/2003 | Galer | |
| 2004/0020131 A1 | 2/2004 | Galer et al. | |
| 2005/0073172 A1 | 4/2005 | Weinert et al. | |
| 2007/0157522 A1 | 7/2007 | Hebert et al. | |
| 2008/0122262 A1 | 5/2008 | Cicala | |
| 2008/0238134 A1 | 10/2008 | Guellec | |
| 2008/0263960 A1 | 10/2008 | Murphy et al. | |
| 2010/0122497 A1 | 5/2010 | Lahnala | |
| 2010/0269412 A1 | 10/2010 | Mellary et al. | |

OTHER PUBLICATIONS

International Search Report for Application No. PCT/US2011/063076 dated Apr. 5, 2012, 4 pages.

* cited by examiner

*Primary Examiner* — Glenn Dayoan
*Assistant Examiner* — Jason S Daniels
(74) *Attorney, Agent, or Firm* — Howard & Howard Attorneys PLLC (57) ABSTRACT

A sliding window assembly for a vehicle comprises a first fixed panel and a second fixed panel spaced from the first fixed panel. A sliding panel is movable relative to the fixed panels. A rail is coupled to the fixed panels. The rail has a channel portion for receiving the sliding panel and an attachment portion extending from the channel portion. The attachment portion has an interior surface. The sliding window assembly further comprises an elongated member that couples the rail to the fixed panels. The elongated member partially encapsulates the rail with a portion of the interior surface of the attachment portion free of the elongated member to present an exposed bonding surface. The exposed bonding surface allows the rail to be bonded to the flange of the vehicle for mounting the sliding window assembly to the vehicle.

29 Claims, 9 Drawing Sheets

SLIDING WINDOW ASSEMBLY

BACKGROUND OF THE INVENTION

1. Field of the Invention

The invention generally relates to a sliding window assembly. More specifically, the invention relates to a siding window assembly for a vehicle.

2. Description of the Related Art

Sliding window assemblies for vehicles are known in the art. Generally, the sliding window assemblies are mounted to a flange of the vehicle. A typical sliding window assembly includes a first and a second fixed panel configured to be coupled to the vehicle. The first and the second fixed panels are spaced from each other and define an opening therebetween. A sliding panel is movable relative to the fixed panels between a closed position and an open position to modify a size of the opening.

Typically, the sliding window assembly includes an upper track and a lower track spaced from the upper track. Each of the tracks is attached to the fixed panels. The sliding panel is movable along the tracks between the open and closed positions. Each of the tracks includes an elongated member and a rail with the elongated member disposed about an exterior of the rail for coupling the rail to the fixed panels. An adhesive comprising polyurethane is applied to a periphery of the fixed panels and the elongated member to bond the sliding window assembly to the flange of the vehicle. The elongated member provides a bonding surface within the opening between the fixed panels.

Typically, the elongated member comprises a polyvinyl chloride (PVC) material. Due to environmental concerns, there is a desire in the automotive industry to move toward using other materials, such as a thermoplastic polyolefin (TPO) material instead of the PVC material. However, a bond between the adhesive and the TPO material is weaker that a bond strength between the adhesive and the PVC material. The weaker bond strength that results from using the TPO material can result in the elongated member breaking free from the flange of the vehicle. If the elongated member breaks free of the flange, the elongated member may rattle against the flange causing unwanted noise. Additionally, the rattling of the elongate member may lead to a weakening of the bond between the fixed panels and the flange resulting in the sliding window assembly breaking free from the flange and falling off the vehicle. An attempted solution to increase the bond between the adhesive and the TPO material has been to include a primer on the TPO material. However, the use of the primer adds time and cost to the manufacturing of the sliding window assembly. Additionally, the primer is not effective in increasing the bond strength between the adhesive and the TPO material to a required strength such as the bond strength formed directly between the adhesive and the PVC material. Therefore, there remains a need to provide an improved sliding window assembly.

SUMMARY OF THE INVENTION AND ADVANTAGES

A sliding window assembly is for mounting to a flange of a vehicle. The sliding window assembly comprises a first fixed panel and a second fixed panel spaced from the first fixed panel to define an opening therebetween. A sliding panel is movable relative to the fixed panels between a closed position and an open position such that a size of the opening can be modified. The sliding window assembly also comprises a rail coupled to the fixed panels. The rail has a channel portion defining a U-shaped channel for receiving the sliding panel. The rail also has an attachment portion extending from the channel portion opposite the U-shaped channel. The attachment portion has an interior surface. The sliding window assembly further comprises an elongated member coupling the rail to the fixed panels. The elongated member partially encapsulates the rail with a portion of the interior surface of the attachment portion free of the elongated member to present an exposed bonding surface of the attachment portion. The exposed bonding surface is for receiving an adhesive bead to bond the rail to the flange of the vehicle and mount the sliding window assembly to the vehicle.

Accordingly, the present invention has several advantages over known sliding window assemblies. Once such advantage is that the exposed bonding surface allows the adhesive bead to be applied to the rail without contacting the elongated member. As such, the elongated member may contain any desired material without affecting the mounting of the sliding window assembly to the flange of the vehicle.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE EXEMPLARY EMBODIMENT

Figure 1:
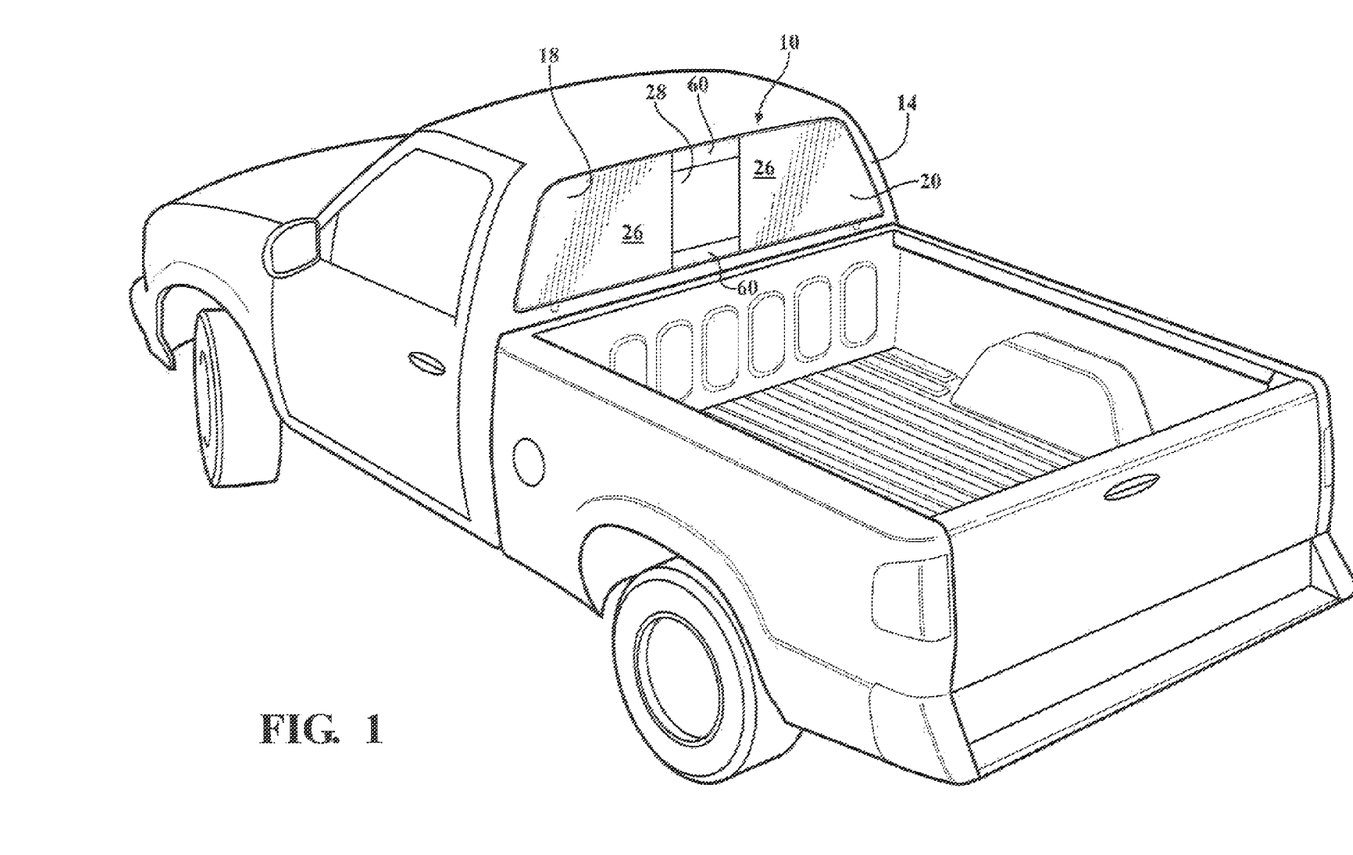
FIG. 1 is a perspective view of a sliding window assembly mounted to a vehicle.

Referring to the Figures, wherein like numerals indicate corresponding parts throughout the several views, a sliding window assembly 10 for mounting to a flange 12 of a vehicle 14 is generally shown. Generally, the flange 12 defines an aperture. With reference to FIG. 1, the sliding window assembly 10 is shown mounted to the flange 12 of the vehicle 14 for covering the aperture. The sliding window assembly 10 is specifically shown as a backlite of a pickup truck in FIG. 1. However, it is to be appreciated that the sliding window assembly 10 of the present invention can be implemented in other types of vehicles, as well as in non-vehicle applications. It is also to be appreciated that the sliding window assembly 10 can be either a manual sliding window assembly 10 or a power sliding window assembly 10.

The sliding window assembly 10 includes a first fixed panel 18 and a second fixed panel 20 spaced from the first fixed panel 18 to define an opening 22 therebetween. A distance D is defined between the fixed panels 18, 20. The fixed panels 18, 20 are typically formed of glass. However, the fixed panels 18, 20 may be formed from any suitable material such as plastic or metal. The fixed panels 18, 20 have an interior surface 24, which faces an interior of the vehicle 14 when the sliding window assembly 10 is mounted to the vehicle 14. The fixed panels 18, 20 also have an exterior surface 26, which faces an exterior of the vehicle 14 when the sliding window assembly 10 is mounted to the vehicle 14.

Figure 2:
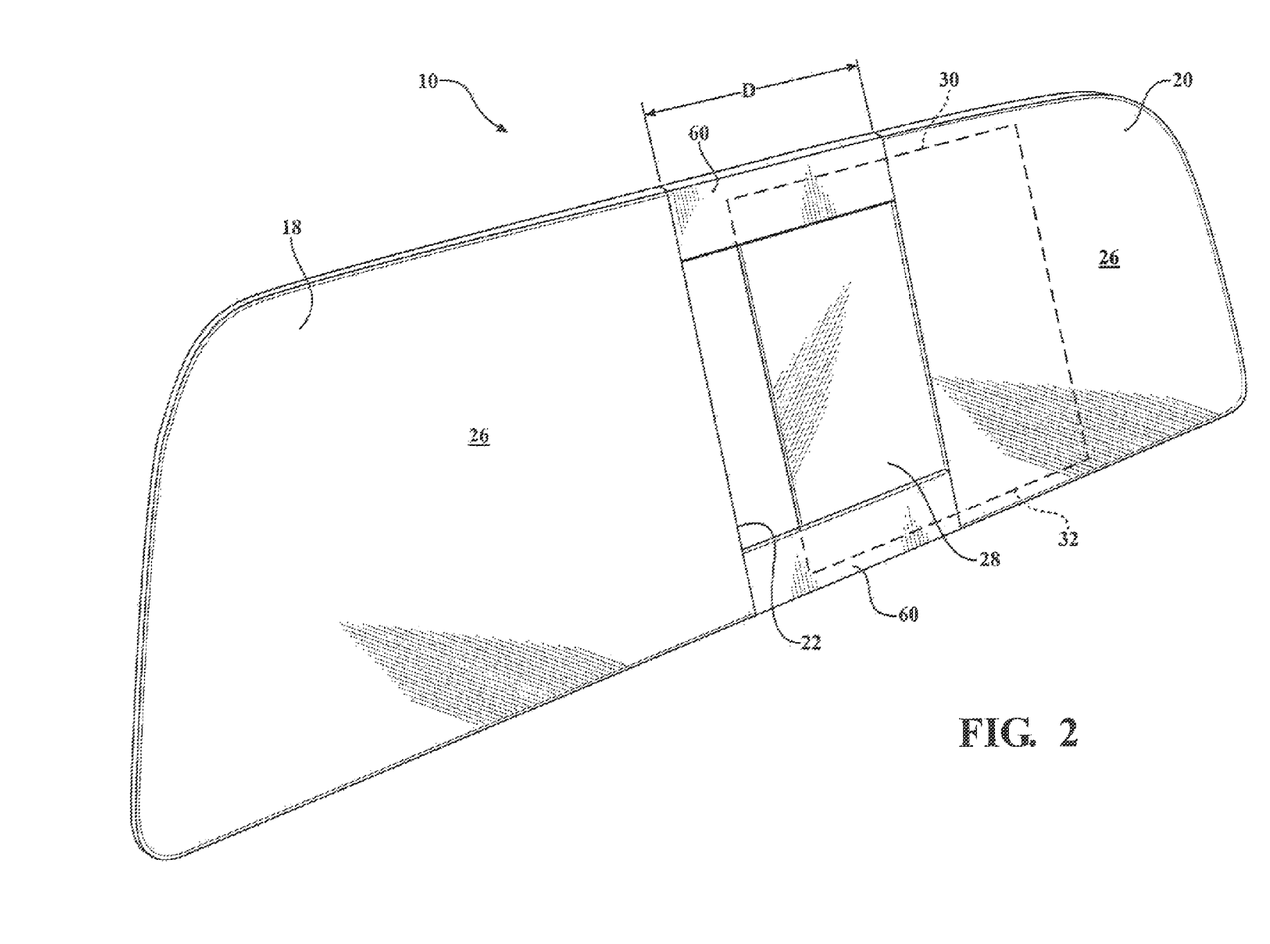
FIG. 2 is a perspective view of the sliding window assembly showing an exterior surface of a first fixed panel and a second fixed panel spaced from the first fixed panel to define an opening therebetween.
Figure 3A:
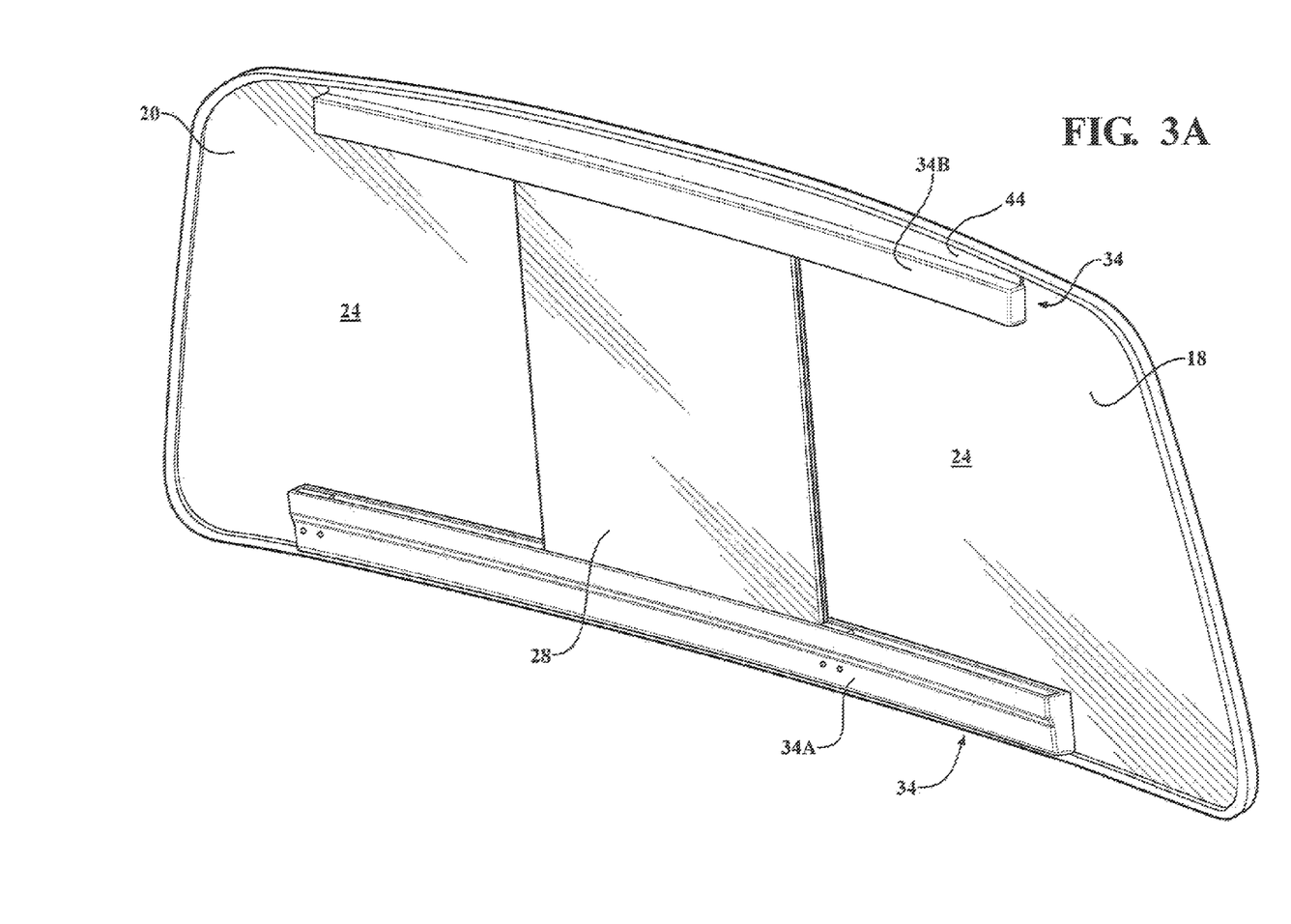
FIG. 3A is a perspective view of the sliding window assembly showing an interior surface of the fixed panels with a first track and a second track coupled to the fixed panels.
Figure 3B:
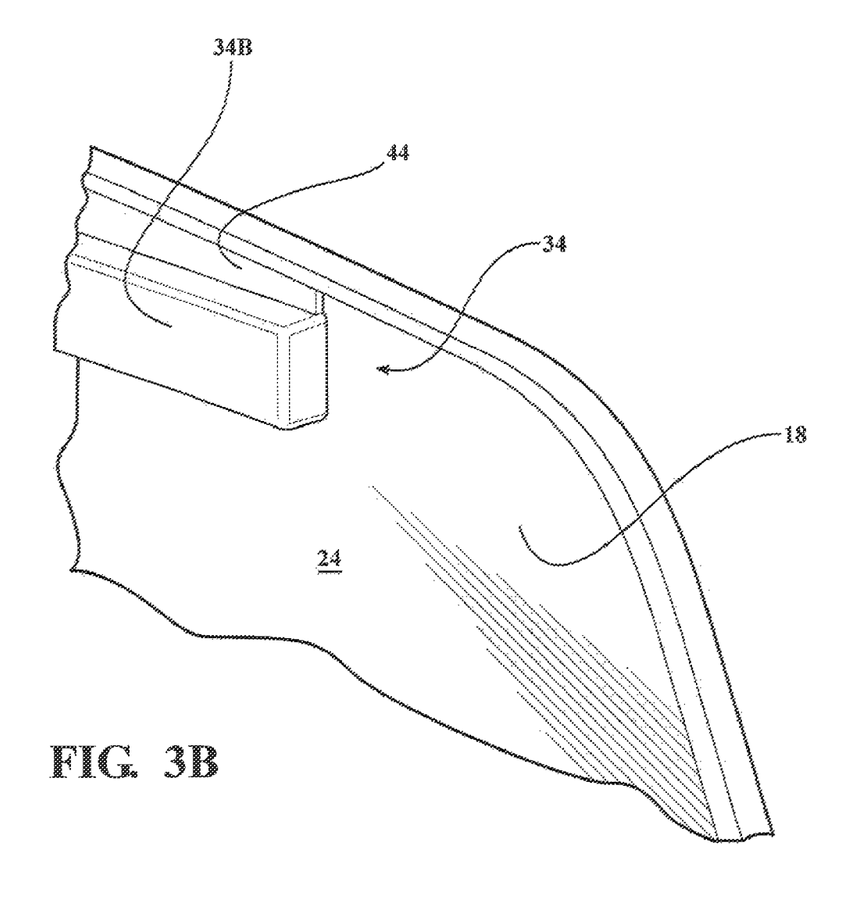
FIG. 3B is an enlarged perspective view of a portion of the sliding window assembly of FIG. 3A.
Figure 7:
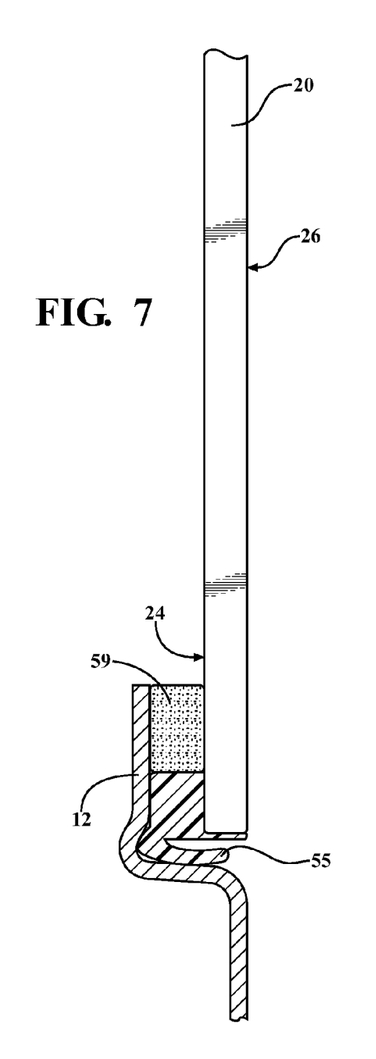
FIG. 7 is a cross-sectional view of the track taken along line 7-7 of FIG. 4A with the second fixed panel coupled to a flange of the vehicle.
Figure 9:
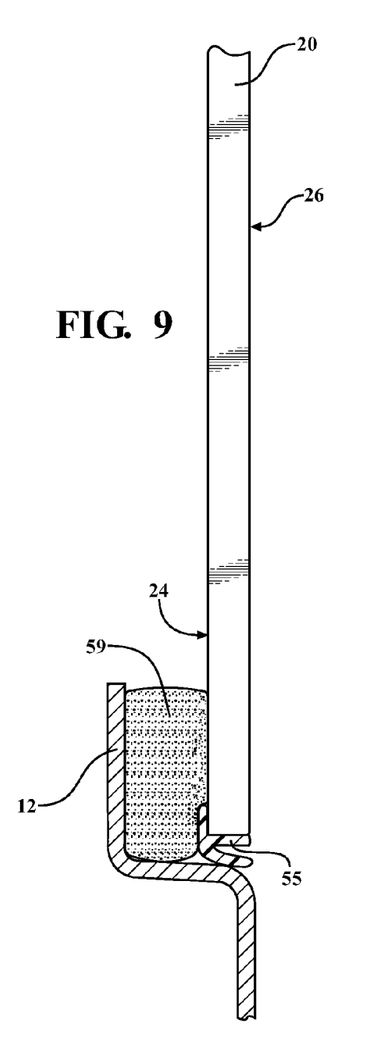
FIG. 9 is a cross-sectional view of the track taken along line 9-9 of FIG. 5A with the second fixed panel coupled to the flange of the vehicle.

A sliding panel 28 is movable relative to the fixed panels 18, 20 between a closed position and an open position such that a size of the opening 22 can be modified. In the closed position, the sliding panel 28 completely covers the opening 22 as shown in FIGS. 1, 3A, and 3B. In the open position, the sliding panel 28 may only partially cover the opening 22, as shown in FIG. 2, or the opening 22 may be unobstructed by the sliding panel 28. With reference to FIG. 2, the sliding panel 28 has a top edge 30 and a bottom edge 32 spaced from the top edge 30. Typically, the sliding panel 28 is disposed in an offset relationship to the fixed panels 18, 20. Said differently, the sliding panel 28 is not in-line with the fixed panels 18, 20. It is to be appreciated that the sliding panel 28 may index into the opening 22 such that the sliding panel 28 is in-line with the fixed panels 18, 20 when in the closed position. Like the fixed panels 18, 20, the sliding panel 28 is typically formed of glass, but can be formed of any suitable material such as plastic and metal. The fixed panels 18, 20 are bonded to the flange 12 of the vehicle 14 for coupling the sliding window assembly 10 to the vehicle 14, as shown in FIGS. 7 and 9.

Figure 8:
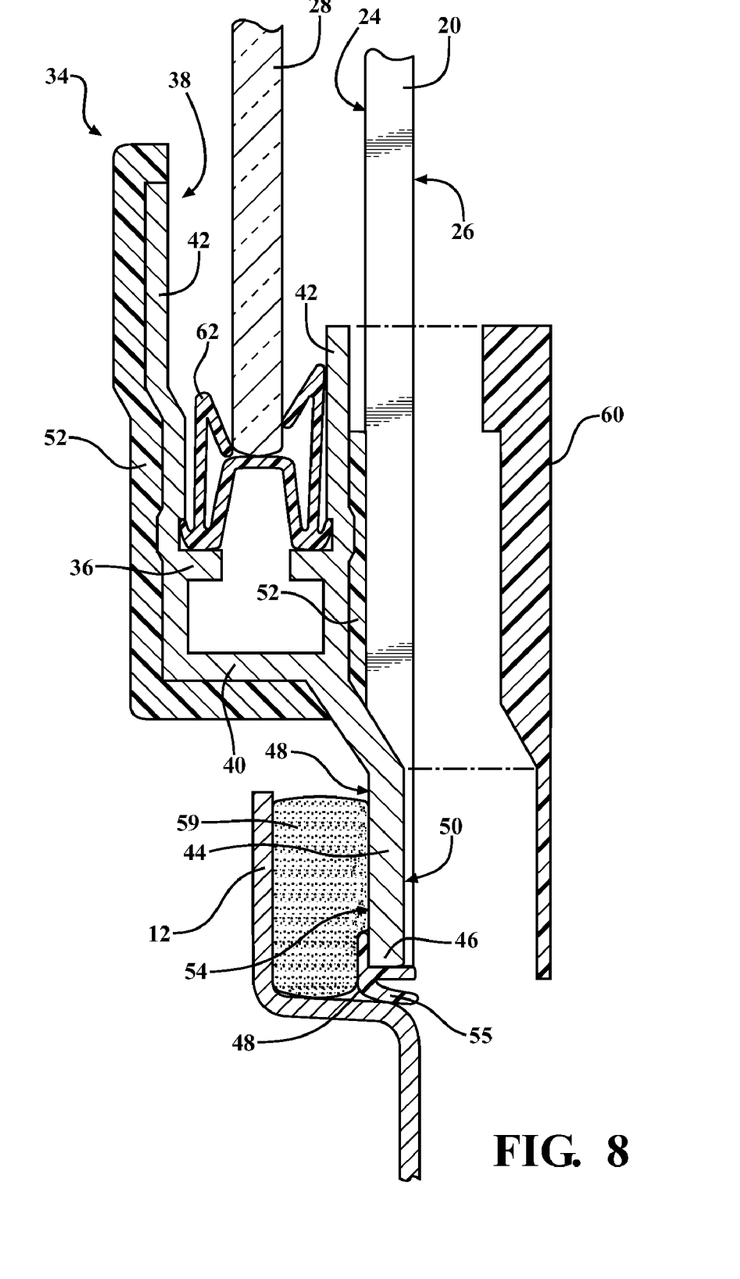
FIG. 8 is a cross-sectional view of the track taken along line 8-8 of FIG. 5A showing a second embodiment of the track wherein the exposed bonding surface of the attachment portion of the rail is flush with the interior surface of the fix panels.

With reference to FIGS. 3A-5B, the sliding window assembly 10 includes at least one track 34, which is also commonly referred to throughout the industry as a run channel. Generally, the track 34 is coupled to the fixed panels 18, 20 and spans the opening 22 defined between the fixed panels 18, 20. With reference to FIGS. 6 and 8, the track 34 includes a rail 36 coupled to the fixed panels 18, 20. Typically, the rail 36 comprises a metal, such as aluminum. However, it is to be appreciated that the rail 36 may comprise any suitable material. The rail 36 has a channel portion 38 defining a U-shaped channel for receiving the sliding panel 28. More specifically, the channel portion 38 of the rail 36 includes a base member 40 and a pair of side members 42 each extending from the base member 40 to define the U-shaped channel. It is to be appreciated that the channel portion 38 may define other shaped channels, such as J-shaped and L-shaped channels. The U-shaped channel receives the sliding panel 28 for allowing the rail 36 to guide the sliding panel 28 between the open and closed positions.

The rail 36 also has an attachment portion 44 extending from the channel portion 38 opposite the U-shaped channel. More specifically, the attachment portion 44 extends from the base member 40 of the channel portion 38 of the rail 36 in an opposite direction relative to the side members 42 to an end 46. It is to be appreciated that the attachment portion 44 and the side members 42 may be aligned with one another. Alternatively, the attachment portion 44 may be offset relative to the side members 42. The channel portion 38 and the attachment portion 44 of the rail 36 generally present an h-shaped configuration as shown in FIGS. 6 and 8. The attachment portion 44 has an interior surface 48 and an exterior surface 50 opposite the interior surface 48 of the attachment portion 44. Generally, the interior surface 48 of the attachment portion 44 faces the interior of the vehicle 14 and, more specifically, the flange 12 of the vehicle 14, when the sliding window assembly 10 is mounted to the vehicle 14. Additionally, the exterior surface 50 of the attachment portion 44 faces the exterior of the vehicle 14 when the sliding window assembly 10 is mounted to the vehicle 14. The interior surface 48 of the attachment portion 44 extends between the base member 40 of the channel portion 38 of the rail 36 and the end 46 of the attachment portion 44.

The track 34 also includes an elongated member 52 coupling the rail 36 to the fixed panels 18, 20. The elongated member 52 spans the opening 22 and is bonded to the fixed panels 18, 20. The elongated member 52 may be formed by a process commonly referred to in the industry as glass encapsulation. When glass encapsulation is employed, the elongated member 52 is formed in the presence of the fixed panels 18, 20, which results in the elongated member 52 bonding to the fixed panels 18, 20. The rail 36 may also be present when the elongated member 52 is formed to bond the elongated member 52 to the rail 36 thereby bonding the rail 36 to the fixed panels 18, 20. The glass encapsulation can be a single-sided encapsulation, a two-sided encapsulation, or a three-sided encapsulation. It should be appreciated that the adhesive surface bonding can be any type of adhesive surface bonding other than glass encapsulation without departing from the nature of the present invention. The elongated member 52 typically comprises a thermoplastic polyolefin (TPO) material. Additionally, the elongated member 52 may be free of polyvinyl chloride. Furthermore, the elongated member 52 may be formed entirely from the TPO material. It should be appreciated that the elongated member 52 may be formed from any type of material suitable for glass encapsulation. For example, the elongated member 52 may comprise any of a thermoplastic elastomer material and a thermoplastic vulcanized material.

The elongated member 52 partially encapsulates the rail 36 such that at least a portion of the interior surface 48 of the attachment portion 44 free of the elongated member 52. The portion of the interior surface 48 of the attachment portion free of the elongated member 52 presents an exposed bonding surface 54 of the attachment portion 44. It is to be appreciated that the interior surface 48 of the attachment portion 44 may be completely free of the elongated member 52, as shown in FIG. 6. Said differently, the elongated member 52 is not disposed on the interior surface 48 of the attachment portion 44 between the base member 40 of the channel portion 38 and the end 46 of the attachment portion 44. Alternatively, the elongated member 52 may wrap around the end 46 of the attachment portion 44 such that the elongated member 52 is disposed on a portion of the interior surface 48 of the attachment portion 44, as shown in FIG. 8.

The elongated member 52 may form a sealing lip 55 to seal between the sliding window assembly 10 and the vehicle 14. Alternatively, the sealing lip 55 may be a discrete component relative to the elongated member 52. It is to be appreciated that the sealing lip 55 is also disposed about a periphery of the fixed panels 18, 20. It is to be appreciated that although not shown in FIG. 6, the elongated member 52 may wrap around the end 46 of the attachment portion 44 when the exposed bonding surface 54 is not flush with the interior surface 24 of the fixed panels 18, 20.

The exposed bonding surface 54 allows the rail 36 to be bonded to the flange 12 of the vehicle 14 for coupling the sliding window assembly 10 to the vehicle 14 without bonding the flange 12 to the elongated member 52. As introduced above, the fixed panels 18, 20 are also bonded to the flange 12 of the vehicle 14, as shown in FIGS. 7 and 9. The fixed panels 18, 20 and the attachment portion 44 provide a continuous bonding surface about a periphery of the sliding window assembly 10. With reference to FIG. 6 showing a first embodiment of the track 34, the attachment portion 44 of the rail 36 may be offset from the fixed panels 18, 20 such that the exposed bonding surface 54 is not flush with the interior surface 24 of the fixed panels 18, 20. Therefore, the continuous bonding surface may be stepped where the attachment portion 44 meets the fixed panels 18, 20. When the attachment portion 44 of the rail 36 is offset from the fixed panels 18, 20, the flange 12 of the vehicle 14 may also be stepped between the fixed panels for receiving the attachment portion 44 of the rail 36 because the continuous bonding surface is stepped where the attachment portion 44 meets the fixed panels 18, 20.

With reference to FIG. 8 showing a second embodiment of the track 34, the exposed bonding surface 54 of the attachment portion 44 of the rail 36 may be in-line with the interior surface 24 of the fixed panels 18, 20 such that the exposed bonding surface 54 of the attachment portion 44 is flush with the interior surface 24 of the fixed panels 18, 20. Therefore, when the exposed bonding surface 54 is flush with the interior surface 24 of the fixed panels 18, 20, the continuous bonding surface is not stepped where the attachment portion 44 meets the fixed panels 18, 20 and therefore the continuous bonding surface is flush about the periphery of the sliding window assembly 10. Having the attachment portion 44 of the rail 36 in-line with the fixed panels 18, 20 allows the flange 12 of the vehicle 14 to be constant because the continuous bonding surface is flush about the periphery of the sliding window assembly 10. It is to be appreciated that although not shown in FIG. 6, the elongated member 52 may wrap around the end 46 of the attachment portion 44 when the exposed bonding surface 54 is not flush with the interior surface 24 of the fixed panels 18, 20.

Figure 4A:
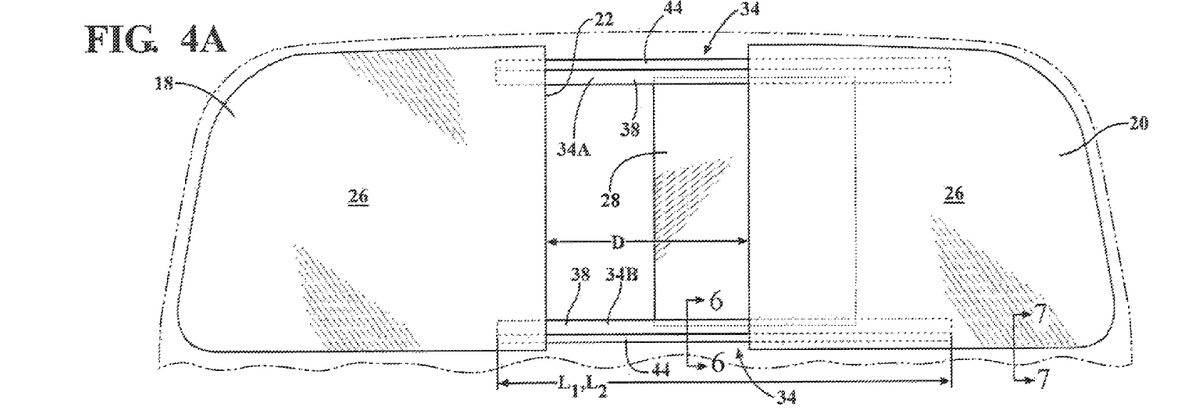
FIG. 4A is a front view of the sliding window assembly showing the exterior surface of the fixed panels wherein the tracks include a rail having channel portion and an attachment portion wherein the attachment portion is the same length of the channel portion.
Figure 4B:
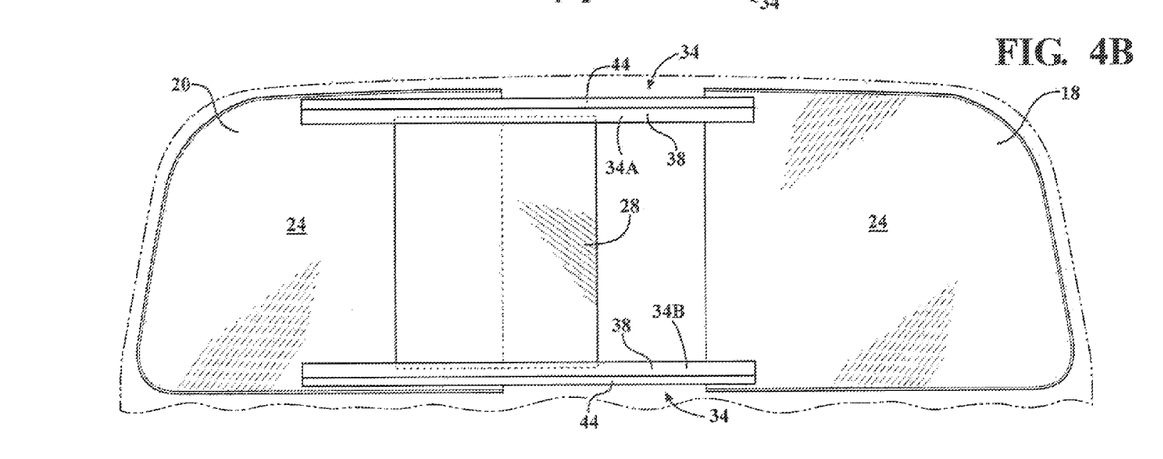
FIG. 4B is a front view of the sliding window assembly showing the interior surface of the fixed panels wherein the attachment portion is the same length as the channel portion.
Figure 5A:
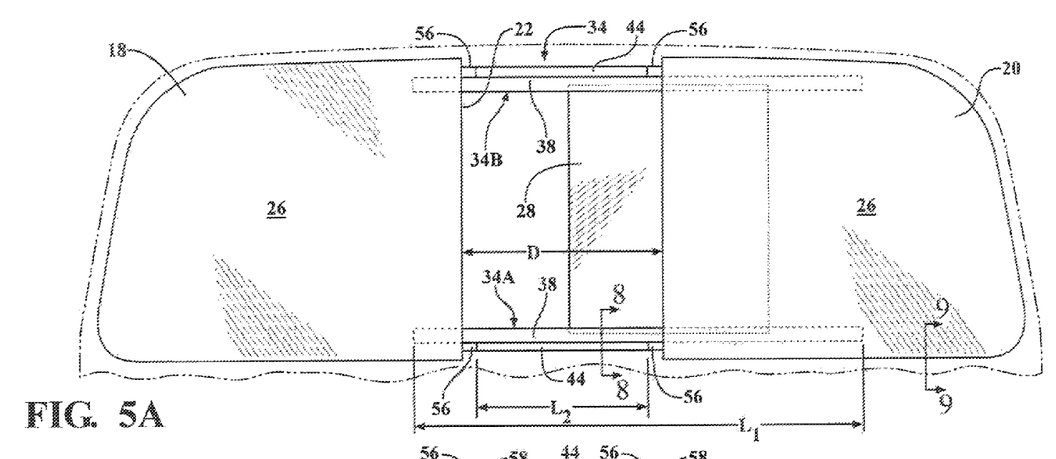
FIG. 5A a front view of the sliding window assembly showing the exterior surface of the fixed panels wherein the attachment portion is shorter than the channel portion.
Figure 5B:
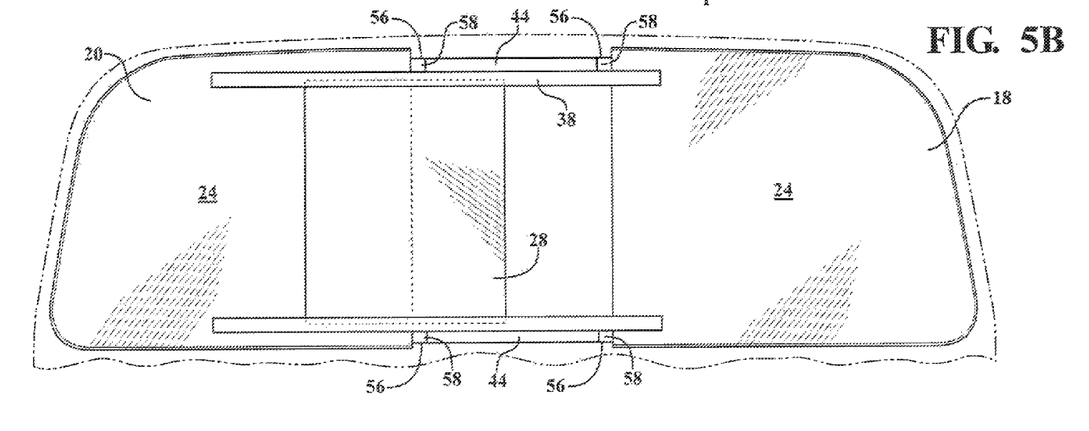
FIG. 5B is a front view of the sliding window assembly showing the interior surface of the fixed panels wherein the attachment portion is shorter than the channel portion.
Figure 6:
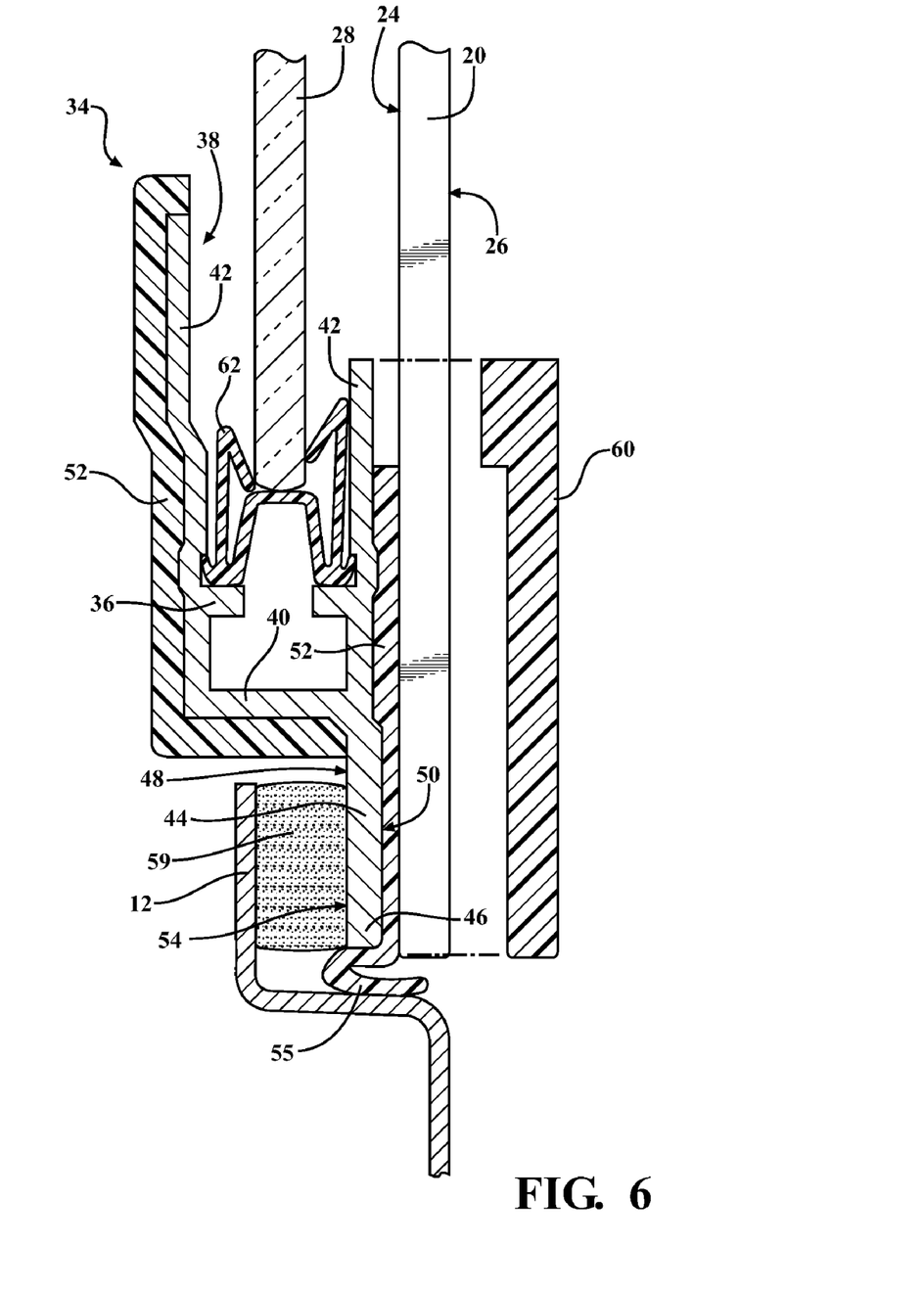
FIG. 6 is a cross-sectional view of the track taken along line 6-6 of FIG. 4A showing a first embodiment of the track wherein an exposed bonding surface of the attachment portion is not flush with the interior surface of the fix panels.

With reference to FIGS. 4A-5B, the attachment portion 44 is disposed between the fixed panels 18, 20 within the opening 22 with the channel portion 38 of the rail 36 having a length L1 and the attachment portion 44 of the rail 36 also having a length L2. It is to be appreciated that the length L2 of the attachment portion 44 does not have to be equal to the length L1 of the channel portion 38 such that the length L1 of the channel portion 38 may be greater than the length L2 of the attachment portion 44, as shown in FIGS. 5A and 5B. In other words, the length L2 of the attachment portion 44 is shorter than the length L1 of the channel portion 38 such that the attachment portion 44 does not span the opening 22 defined between the fixed panels 18, 20 whereas the channel portion 38 does span the opening 22. Having the length L2 of the attachment portion 44 shorter than the length L1 of the channel portion 38 allows the attachment portion 44 to be flush with the interior surface 24 of the fixed panels 18, 20 even though the channel portion 38 is coupled to the interior surface 24 of the fixed panels 18, 20. Alternatively, the length L2 of the attachment portion 44 may be equal to the length L1 of the channel portion 38 such that the attachment portion 44 spans the opening 22 defined between the fixed panels 18, 20, as shown in FIGS. 4A and 4B.

It is to be appreciated that the attachment portion 44 may span the opening 22 defined between the fixed panels 18, 20, as shown in FIGS. 4A and 4B, to provide rigidity to the attachment portion 44. Alternatively, the attachment portion 44 may only be provided between the fixed panels 18, 20 such that the attachment portion does not span the opening 22 defined between the fixed panels 18, 20. For example, the distance D defined between the fixed panels 18, 20 may be greater than the length L2 of the attachment portion 44 of the rail 36. Said differently, the attachment portion 44 may be shorter than the distance D between the fixed panels 18, 20 such that the attachment portion 44 does not span the opening 22, as shown in FIGS. 5A and 5B. The attachment portion 44 may be shorter than the distance D for allowing the attachment portion 44 to index into the opening 22 relative to the channel portion 38 such that the attachment portion 44 is in-line with the fixed panels 18, 20. Typically, when the attachment portion 44 is shorter than the distance D between the fixed panels 18, 20, a gap is defined between the attachment portion 44 and each of the fixed panels 18, 20. When the gap between the attachment portion 44 of the rail 36 and each of the fixed panels 18, 20 is present, a bridge element 56 may be disposed in the gap. Typically, the bridge element 56 overlaps the attachment portion 44 and the fixed panels 18, 20. Said differently, the bridge element 56 completely fills the gap. Alternatively, the bridge element 56 may only fill a portion of the gap. With reference to FIG. 5B, the bridge element 56 has an interior surface 58 that is flush with the exposed bonding surface 54 of the attachment portion 44. The interior surface 58 of the bridge element 56 may also be flush with the interior surface 24 of the fixed panels 18, 20. Typically, the bridge element 56 comprises a polyurethane. Additionally, the bridge element 56 may be formed by using window spray technology. For example, the bridge element 56 may be formed by spraying the polyurethane into the gap and allowing the polyurethane to cure. It is to be appreciated that tape, putty, or butyl may also be used to form the bridge element 56 in the gap. It is also to be appreciated that the lip 55 may also be formed using the window spray technology.

The sliding window assembly 10 may include an adhesive bead 59. Generally, the adhesive bead 59 is applied to the continuous bonding surface to bond the sliding window assembly 10 to the flange 12 of the vehicle 14. The exposed bonding surface 54 receives the adhesive bead 59 to bond the rail 36 to the flange 12 of the vehicle 14 to mount the sliding window assembly 10 to the vehicle 14. The adhesive bead 59 is also disposed on the interior surface 24 of the fixed panels 18, 20 for coupling the sliding window assembly 10 to the flange 12 of the vehicle 14, as shown in FIGS. 7 and 9. The adhesive bead 59 may be in direct contact with either of the exposed bonding surface 54 of the attachment portion 44 of the rail 36 or the flange 12 of the vehicle 14. Alternatively, an intermediate layer, such as a primer, may be used between the adhesive bead 59 and either of the exposed bonding surface 54 of the attachment portion 44 of the rail 36 or the flange 12 of the vehicle 14. Providing the exposed bonding surface 54, which is free of the elongated member 52, allows the elongated member 52 to comprise the TPO material while still providing a required bond strength between the sliding window assembly 10 and the flange 12 of the vehicle 14 because the rail 36 can be directly bonded to the flange 12 of the vehicle 14. When the bridge element 56 is present, the adhesive bead 59 is disposed on the interior surface 58 of the bridge element 56, the exposed bonding surface 54 of the attachment portion 44, and the interior surface 24 of the fixed panels 18, 20 for coupling the sliding window assembly 10 to the flange 12 of the vehicle 14.

As shown in FIGS. 3A-5B, the at least one track 34 may be further defined as a first track 34A coupled to the fixed panels 18, 20 and a second track 34B coupled to the fixed panels 18, 20 spaced from and substantially parallel to the first track 34A. The tracks 34A, 34B rigidly interconnect the fixed panels 18, 20. The tracks 34A, 34B span the opening 22 defined between the fixed panels 18, 20. Generally, the tracks 34A, 34B guide the sliding panel 28 as the sliding panel 28 moves between the closed and open positions. The sliding panel 28 may be disposed within the tracks 34A, 34B. Generally, the sliding panel 28 is disposed within the U-shaped channel of the rail 36 of each of the tracks 34. The sliding panel 28 is moveable relative to the fixed panels 18, 20 along the tracks 34.

The sliding panel 28 typically slides horizontally along the tracks 34A, 34B but it should be appreciated that the sliding panel 28 can also slide in other directions, e.g. vertically, without departing from the nature of the present invention. In FIGS. 3A and 3B, the sliding panel 28 slides to the left to the open position and slides to the right to the closed position, but it should be appreciated that the sliding panel 28 can slide in any direction between the open and closed position without departing from the nature of the present invention. It should also be appreciated that the sliding panel 28 can slide in more than one direction from the closed to the open positions. Typically, when the sliding panel 28 is moveable horizontally, the tracks 34A, 34B extend generally horizontally along the periphery of the fixed panels 18, 20. Alternatively, when the sliding panel 28 is moveable vertically, the tracks 34A, 34B extend generally vertically between the periphery of the sliding window assembly 10.

With reference to FIGS. 6 and 8, although not required, an appliqué 60 may be coupled to the track 34 for providing a decorative appearance to the sliding window assembly 10. Specifically, the appliqué 60 is situated in the opening 22 between the fixed panels 18, 20 along the track 34. The appliqué 60 has a finished surface that is flush with the exterior surface 26 of the fixed panels 18, 20. The appliqué 60 is typically formed of a polycarbonate plastic, but can be formed of other plastics, glass, metal, and the like. It should be appreciated that the appliqué 60 may be attached to the elongated member 52 in any fashion, for example by adhesive. With reference to FIG. 8, the elongated member 52 may be flush with the exterior surface 26 of the fixed panels 18, 20 for providing the decorative appearance instead of the appliqué 60. Additionally, although not shown in FIG. 6, it is to be appreciated that the elongated member 52 may be flush with the exterior surface 26 of the fixed panels 18, 20 similar to the elongated member 52 shown in FIG. 8.

A channel insert 62 may be fixed within the U-shaped channel of the rail 36. When the channel insert 62 is present, at least the bottom edge 32 of the sliding panel 28 is in sliding engagement with the channel insert 62 and the sliding panel 28 is movable along the channel insert 62. The channel insert 62 reduces a coefficient of friction between the sliding panel 28 and the tracks 34 for reducing a work required to move the sliding panel 28 between the open and closes positions. The channel insert 62 may be fixed within the tracks 34A, 34B to prevent the channel insert 62 from moving along the tracks 34A, 34B.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sliding window assembly for coupling to a flange of a vehicle, said sliding window assembly comprising:
    a first fixed panel;
    a second fixed panel spaced from said first fixed panel to define an opening therebetween;
    a sliding panel movable relative to said fixed panels between a closed position and an open position such that a size of said opening can be modified;
    a rail overlapping a portion of said fixed panels and coupled to said fixed panels with said rail having a channel portion defining a U-shaped channel for receiving said sliding panel, and an attachment portion extending from said channel portion opposite said U-shaped channel with said attachment portion having an interior surface;
    an elongated member coupling said rail to said fixed panels with said elongated member partially encapsulating said rail with a portion of said interior surface of said attachment portion free of said elongated member to present an exposed bonding surface of said attachment portion; and
    an adhesive bead disposed on said exposed bonding surface to bond said rail to the flange of the vehicle and mount said sliding window assembly to the vehicle;
    wherein said portion of said fixed panels overlapped by said rail is free of the adhesive bead.

2. A sliding window assembly as set forth in claim 1 wherein said elongated member comprises a thermoplastic polyolefin material.

3. A sliding window assembly as set forth in claim 2 wherein said elongated member is free of polyvinyl chloride.

4. A sliding window assembly as set forth in claim 1 wherein said channel portion of said rail and said attachment portion of said rail each have a length and wherein said length of said channel portion is greater than said length of said attachment portion.

5. A sliding window assembly as set forth in claim 4 wherein a distance is defined between said fixed panels that is less than said length of said channel portion of said rail and greater than said length of said attachment portion of said rail.

6. A sliding panel assembly as set forth in claim 5 wherein said exposed bonding surface of said attachment portion of said rail is flush with an interior surface of said fixed panels for providing a flush bonding surface between said attachment portion and said fixed panels.

7. A sliding window assembly as set forth in claim 5 wherein a gap is defined between said attachment portion and each of said fixed panels.

8. A sliding window assembly as set forth in claim 7 further comprising a bridge element disposed in said gap between said attachment portion of said rail and each of said fixed panels with said bridge element having an interior surface that is flush with said exposed bonding surface of said attachment portion and flush with an interior surface of said fixed panels wherein the adhesive bead is disposed on said interior surface of said bridge element, said exposed bonding surface of said attachment portion, and said interior surface of said fixed panels for coupling said sliding window assembly to the flange of the vehicle.

9. A sliding window assembly as set forth in claim 8 wherein said bridge element comprises a polyurethane formed by spraying said polyurethane into said gap.

10. A sliding window assembly as set forth in claim 1 wherein said elongated member wraps around an end of said attachment portion and is disposed on a portion of said interior surface of said attachment portion.

11. A sliding window assembly as set forth in claim 1 wherein said channel portion has a base member and said attachment portion has an end spaced from said base member wherein said interior surface of said attachment portion extends between said base member and said end with said interior surface completely free of said elongated member.

12. A vehicle comprising;
(A) a flange defining an aperture;
(B) a sliding window assembly mounted to said flange for covering said aperture with said sliding window assembly comprising:
  a first fixed panel;
  a second fixed panel spaced from said first fixed panel to define an opening therebetween;
  a sliding panel movable relative to said fixed panels between a closed position and an open position such that a size of said opening is modified;
  a rail overlapping a portion of said fixed panels and coupled to said fixed panels with said rail having a channel portion defining a U-shaped channel for receiving said sliding panel, and an attachment portion extending from said channel portion opposite said U-shaped channel with said attachment portion having an interior surface;
  an elongated member coupling said rail to said fixed panels with said elongated member partially encapsulating said rail with a portion of said interior surface of said attachment portion free of said elongated member to present an exposed bonding surface of said attachment portion; and
(C) an adhesive bead disposed on said exposed bonding surface and said flange for bonding said rail to said flange of said vehicle and mount said sliding window assembly to said vehicle;
  wherein said portion of said fixed panels overlapped by said rail is free of said adhesive bead.

13. A vehicle as set forth in claim 12 wherein said elongated member comprises a thermoplastic polyolefin material.

14. A vehicle as set forth in claim 13 wherein said elongated member is free of polyvinyl chloride.

15. A vehicle as set forth in claim 13 wherein said channel portion of said rail and said attachment portion of said rail each have a length and wherein said length of said channel portion is greater than said length of said attachment portion.

16. A vehicle as set forth in claim 15 wherein a distance is defined between said fixed panels that is less than said length of said channel portion of said rail and greater than said length of said attachment portion of said rail.

17. A vehicle as set forth in claim 16 wherein said exposed bonding surface of said attachment portion of said rail is flush with said interior surface of said fixed panels for providing a flush bonding surface between said attachment portion and said fixed panels.

18. A vehicle as set forth in claim 16 a gap is defined between said attachment portion and each of said fixed panels.

19. A vehicle as set forth in claim 18 further comprising a bridge element disposed in said gap between said attachment portion of said rail and each of said fixed panels with said bridge element having an interior surface that is flush with said exposed bonding surface of said attachment portion and flush with an interior surface of said fixed panels wherein said adhesive bead is disposed on said interior surface of said bridge element, said exposed bonding surface of said attachment portion, and said interior surface of said fixed panels for coupling said sliding window assembly to said flange of said vehicle.

20. A vehicle as set forth in claim 19 wherein said bridge element comprises a polyurethane formed by spraying said polyurethane into said gap.

21. A vehicle as set forth in claim 12 wherein said elongated member wraps around an end of said attachment portion and is disposed on a portion of said interior surface of said attachment portion.

22. A vehicle as set forth in claim 12 wherein said channel portion has a base member and said attachment portion has an end spaced from said base member wherein said interior surface of said attachment portion extends between said base member and said end with said interior surface completely free of said elongated member.

23. A vehicle as set forth in claim 12 wherein said adhesive bead directly contacts at least one of said flange of said vehicle and said exposed bonding surface of said attachment portion of said rail.

24. A vehicle as set forth in claim 12 wherein said adhesive bead directly contacts the exposed bonding surface of said attachment portion of said rail.

25. A sliding window assembly for coupling to a flange of a vehicle, said sliding window assembly comprising:
  a first fixed panel having an interior surface;
  a second fixed panel having an interior surface and spaced from said first fixed panel to define an opening therebetween;
  a sliding panel movable relative to said fixed panels between a closed position and an open position such that a size of said opening can be modified;
  a rail coupled to said fixed panels having a channel portion defining a U-shaped channel for receiving said sliding panel, and an attachment portion extending from said channel portion opposite said U-shaped channel with said attachment portion having an interior surface; and
  an elongated member coupling said rail to said fixed panels with said elongated member partially encapsulating said rail with a portion of said interior surface of said attachment portion free of said elongated member to present an exposed bonding surface of said attachment portion for receiving an adhesive bead to bond said rail to the flange of the vehicle and mount said sliding window assembly to the vehicle;
  wherein said exposed bonding surface of said attachment portion of said rail is flush with said interior surface of said fixed panels for providing a flush bonding surface between said attachment portion and said fixed panels.

26. A sliding window assembly as set forth in claim 25 wherein said elongated member comprises a thermoplastic polyolefin material.

27. A sliding window assembly as set forth in claim 26 wherein said elongated member is free of polyvinyl chloride.

28. A sliding window assembly as set forth in claim 25 wherein said channel portion of said rail and said attachment portion of said rail each have a length and wherein said length of said channel portion is greater than said length of said attachment portion.

29. A sliding window assembly as set forth in claim 28 wherein a distance is defined between said fixed panels that is less than said length of said channel portion of said rail and greater than said length of said attachment portion of said rail.

* * * * *